Oct. 4, 1932.  O. C. REEVES  1,880,485
WEIGHING SCALE
Filed Nov. 22, 1930  2 Sheets-Sheet 1
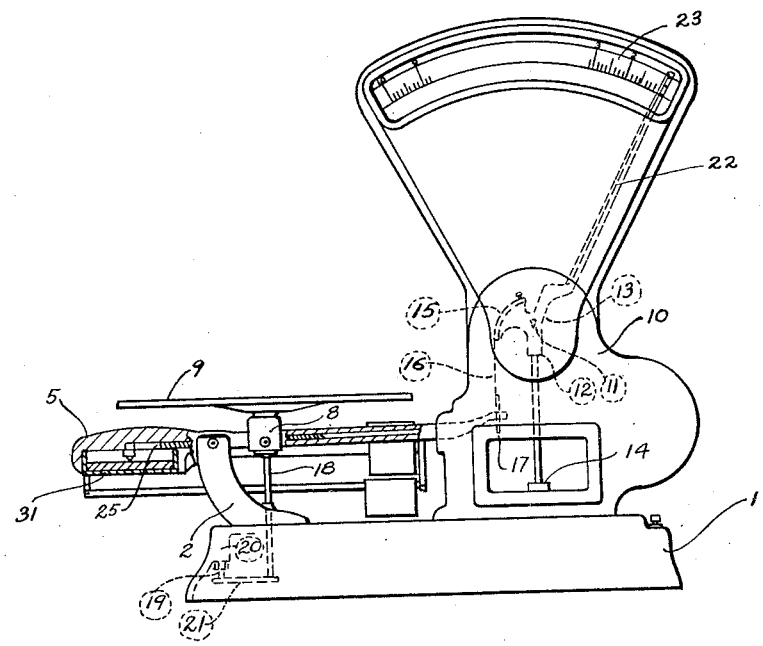
FIG. I
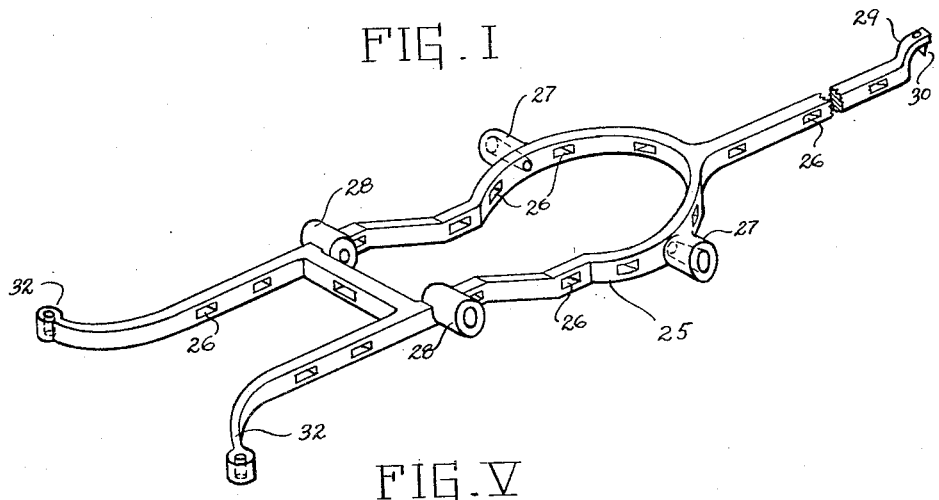
FIG. V
Orwell C. Reeves
INVENTOR
BY C.O. Marshall
ATTORNEY Oct. 4, 1932.  O. C. REEVES  1,880,485
WEIGHING SCALE
Filed Nov. 22, 1930.  2 Sheets-Sheet 2
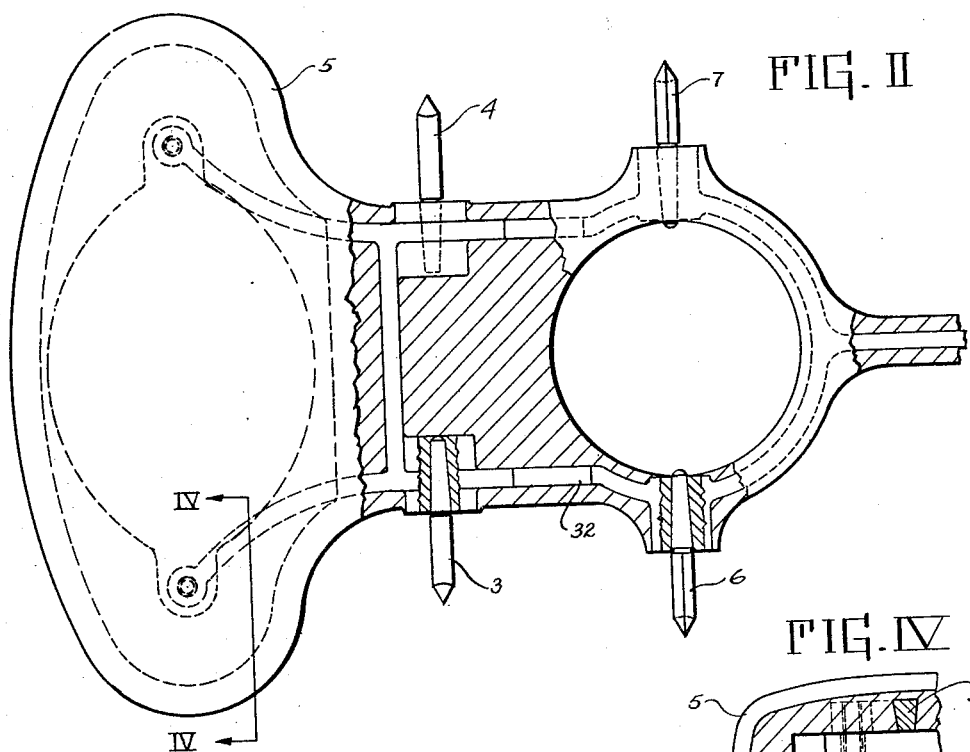
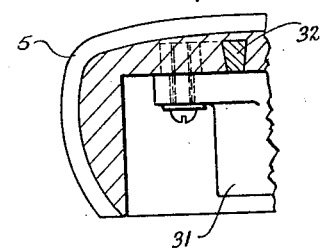
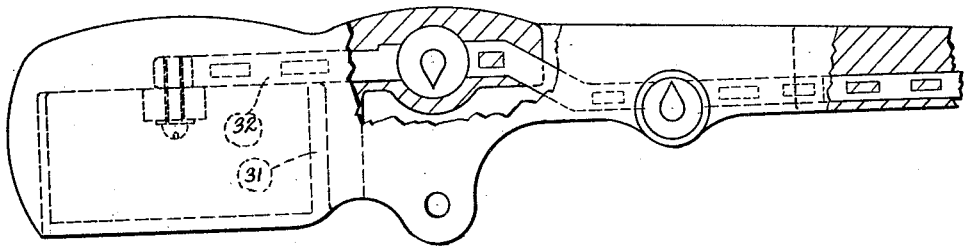
Orwell C. Reeves
INVENTOR
BY *Marshall*
ATTORNEY Patented Oct. 4, 1932

1,880,485

UNITED STATES PATENT OFFICE

ORWELL C. REEVES, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed November 22, 1930. Serial No. 497,464.

This invention relates generally to weighing scales and particularly to that class of weighing scales in which the load supporting lever mechanism is exposed to view. Scales which are employed in retail shops are required to have a first class surface finish which, when the component parts are made of metal, adds considerably to the manufacturing cost as the finishing processes are particular and expensive and the cost is, naturally, reflected in the selling price. It is proposed to make such parts as are in plain view of synthetic resin or other material which will receive its smoothness and finish in the mould. Material suitable for this purpose, however, has very little mechanical strength and such parts as levers, spiders and others which support loads unless reinforced cannot be used. Levers, however, present still another problem; it is necessary that pivots be firmly fixed therein and such plastic material is incapable of retaining them unaided.

The principal object of this invention is therefore the provision of a moulded lever.

Another object is the provision of means for imparting mechanical strength to levers moulded of plastic materials.

A further object of the invention is the provision of means for retaining inserted pivots in moulded levers.

These and other objects and advantages will be apparent from the following description in which reference is had to the accompanying drawings in which similar reference numerals refer to similar parts throughout the several views.

In the drawings:

Figure I is a back elevational view, parts broken away, of a weighing scale embodying my invention.

Figure II is an enlarged fractional plan view of a lever, parts broken away showing the reinforcement means.

Figure III is an enlarged fractional side elevational view, parts broken away, of the above referred to lever.

Figure IV is a sectional view taken substantially along the lines IV—IV of Figure II; and Figure V is a perspective view, a portion broken away, of a lever reinforcing member.

Referring to the drawings in detail, the scale in which I have shown the embodiment of my invention incorporated is of a type that is well known and I will therefore describe it only in such detail as is necessary to properly disclose my invention.

A base 1 which is usually a rigid iron casting, has secured near one of its ends an upwardly extending bifurcated base horn 2 which is provided with suitable bearings in the upper ends of the bifurcation upon which, by means of the fulcrum pivots 3 and 4, a main load supporting lever 5 is pivotally mounted. In spaced relation to the fulcrum pivots 3 and 4 are load pivots 6 and 7 which contact suitable bearings (not shown) in the load supporting spider 8 upon which the load receiver 9 is mounted. The nose end of the lever 5 extends into the interior of a housing 10 which is fastened upon the opposite end of the base 1. Resting upon suitable bearings located within the housing (not shown), is a pendulum fulcrum pivot 11 secured in a pendulum 12 which comprises a body portion 13, a pendulum weight 14 and an eccentric segment 15. A ribbon 16 overlies the eccentric segment and is fastened to its upper end, its lower end is equipped with a stirrup 17 which pivotally engages the nose of the lever 5. To maintain the condition of level of the load receiver 9, the spider 8 has a depending stem 18 which projects through an opening into the hollow portion of the base 1. This base is provided with a stud 19 adjustably threaded into a boss 20 which forms a part of the base 1 and a check link 21 pivotally connects the stem 18 and the stud 19. As the distance between the pivotal points of the check link 21 and the distance between the fulcrum pivots and the load pivots are equal, a parallelogram is formed which prevents the platter from tipping when the load is applied.

When a commodity is placed on the platter, the force resulting therefrom is transmitted through the lever 5 to the stirrup 17. This force acting on one side of the pivot 11 of the pendulum 12 pulls downwardly and forces the pendulum weight 14 outwardly and upwardly until the increasing weight movement counterbalances the load. This outward and upward movement is always in direct proportion to the weight of the commodity and the indicator 22 which is fastened to the pendulum body 13 correspondingly moves across a predetermined angle for any weight within the capacity of the chart and automatically indicates this weight on the chart 23.

It will be seen from the above description that the lever 5, which embodies my invention, supports the weight of the spider 8, the commodity receiver 9 and a load placed thereon. As has been stated in the objects that it is the intention to make this lever from molded plastic material, synthetic resin or similar material which has little mechanical strength, it is the intention when forming the lever to make provision for molding a reinforcement member 25 therein. This member may be a casting, a forging, a stamping or of any rigid construction which can be accurately machined for the reception of the pivots 3, 4, 6 and 7.

In the embodiment shown in Figure V, the member is an integral casting through which a plurality of openings 26 are cored. It is also provided with bosses 27 and 28 for the reception of the load and fulcrum pivots respectively. The nose portion 29 is so shaped as to receive the nose pivot 30.

As it is necessary to counterbalance the dead weight of the lever extending on one side of the axis of the fulcrum pivots and the weight of the spider and load receiver, it has been customary to load the opposite end of the lever with lead or weights of other material. These weights are usually contained in a so called loading box 31 which is usually screwed to the lever. When this lever, however, is made of plastic material, or synthetic resin of low mechanical strength, the screws will not firmly retain it, and the reinforcing member 25 therefore is provided with two rearwardly extending arms 32 which are provided with threaded apertures for the reception of the loading box retaining screws. When making levers of this type the reinforcing member 25 may be completely machined for the reception of the pivots and then be clamped in the die so that when the body portion is molded it will be firmly held by the material as the material enters the cored holes 26 in the reinforcing member. The arms 32 of the reinforcing member 25 cannot be completely surrounded by the molding material and therefore to give them a firmer hold, it is proposed that they may be made slightly tapered as shown in Figure IV. The faces of the bosses 27 and 28 in which the tenons of the pivots are driven, are exposed and if it is desired, the machining operations can be performed after the lever is moulded.

It will be readily seen that a lever made according to the above description combines all the advantages of a cast iron lever stem, it is much lighter and requires no finishing operations when it comes out of the mold. The metallic reinforcement retains the pivots and the loading box in invarying relationship and adds such mechanical strength to the lever as is necessary to prevent bending of the lever under load, which would result in an inaccurate weighing device.

The embodiment of my invention herein shown and described is to be regarded as illustrative only, and it is to be understood that the invention is susceptible to variation, modification and change within the scope of the subjoined claims.

Having described my invention, I claim:

1. In a device of the class described, in combination, a scale lever moulded of material having low mechanical strength and a reinforcing member for said lever, said reinforcing member being formed of material having substantially greater mechanical strength, said reinforcing member being adapted to receive and retain a plurality of pivots.

2. In a device of the class described, in combination, a scale lever of moulded synthetic resin, a metallic reinforcing member capable of being machined moulded into said lever and a plurality of scale elements secured to said metallic reinforcing member.

3. In a weighing scale, in combination, load receiving, load counterbalancing and load indicating mechanisms in co-operative relation, said load receiving mechanism including a lever of moulded synthetic resin having a metallic reinforcing member adapted to increase its mechanical resistance to a load and to receive and retain scale pivots.

4. In a weighing scale, in combination, cooperating load receiving, load counterbalancing and load indicating mechanisms, said load receiving mechanism including a lever having a body of moulded synthetic resin, metallic reinforcing means molded therein, said reinforcing means having portions extending to the surface of said lever body and exposed to view, said exposed portions being adapted for machining.

5. In a weighing scale, in combination, cooperating load receiving, load counterbalancing and load indicating mechanisms, said load receiving mechanism including a lever having a body of moulded synthetic resin, metallic reinforcing means molded therein, said reinforcing means having portions extending to the surface of said lever body and exposed to view, said exposed portions being adapted for machining and to retain scale elements.

6. In a device of the class described, in combination, a metallic member for reinforcing a scale lever having a body of moulded plastic material of substantially little mechanical strength, said member having means for interlocking with said lever body and receiving and retaining scale pivots.

7. In a device of the class described, in combination, a scale lever moulded of synthetic resin having a metallic reinforcing member embedded therein, said reinforcing member having a plurality of apertures for the entrance of the synthetic resin when being moulded, portions of said metallic member extending to the outer surface of said lever and having apertures for the reception of pivots and portions having threaded apertures for the retention of counterbalancing means.

ORWELL C. REEVES.